P. F. HAMBSCH.
RANGE FINDER.
APPLICATION FILED DEC. 16, 1910.
1,001,845.
Patented Aug. 29, 1911.
3 SHEETS—SHEET 1.
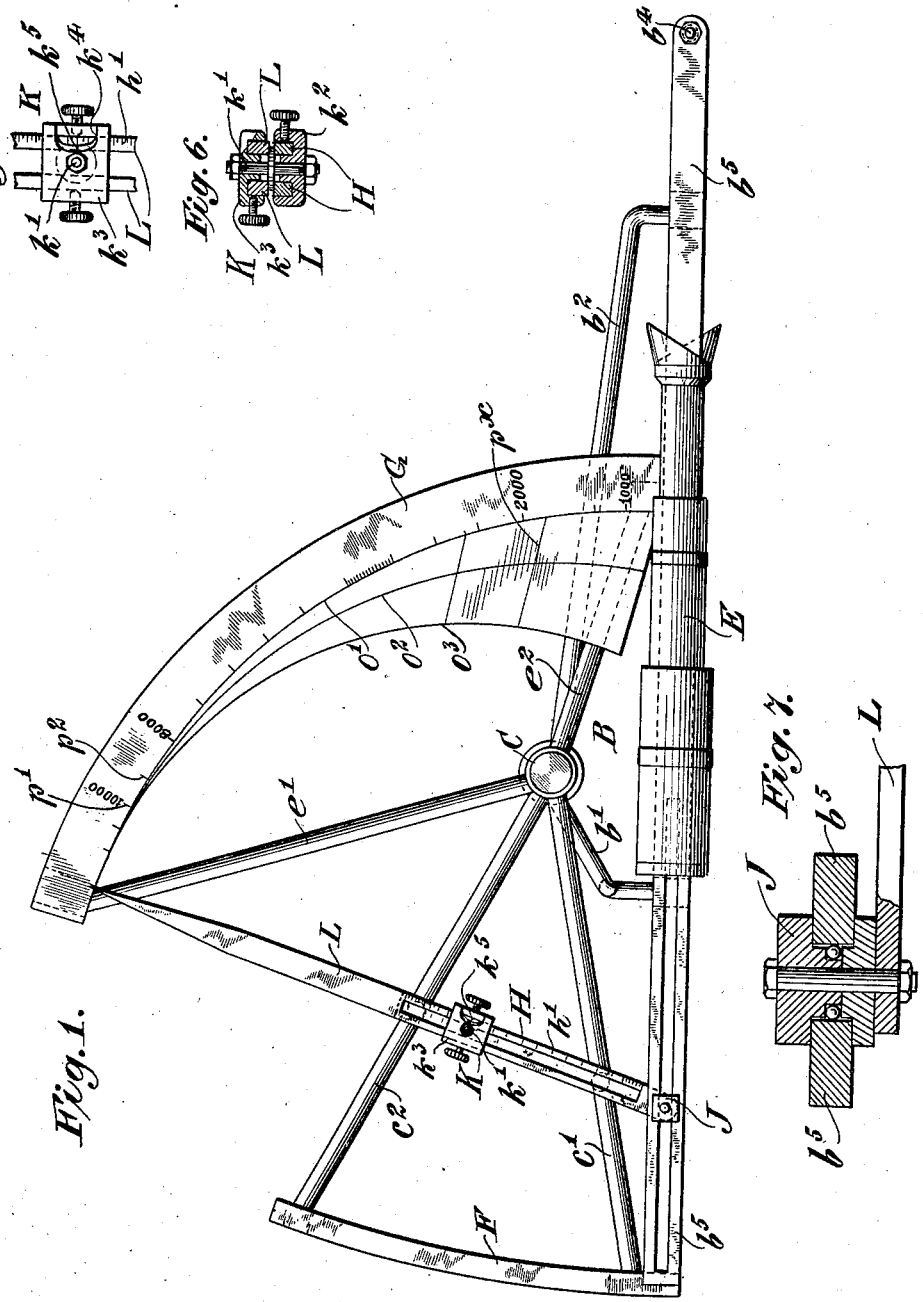
Witnesses:
Geo. Schwarz.
Sully Russo.
Inventor
Philip Frederic Hambsch
By his Attorneys
Kidder & Wendell.

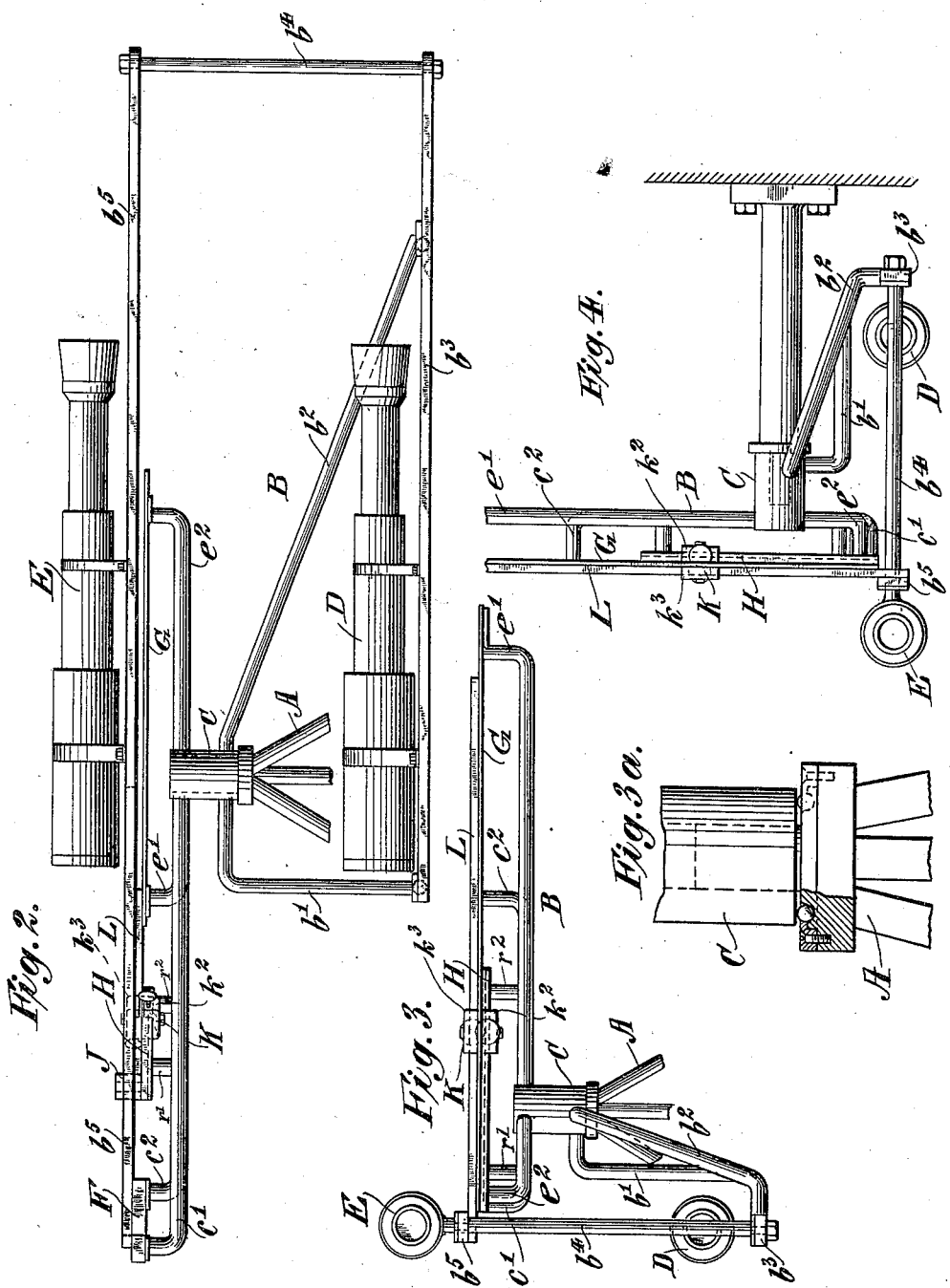

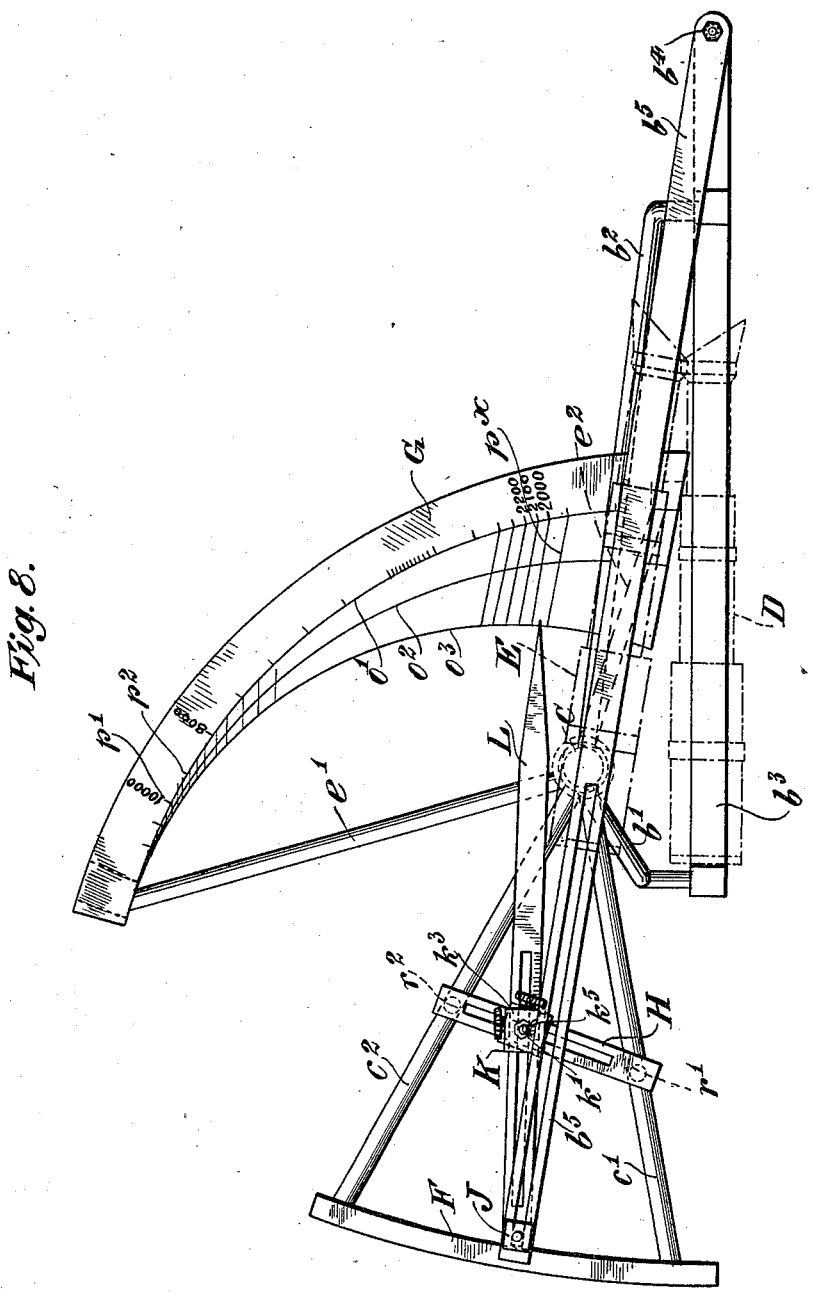

and a resident of Burlington, in the State
UNITED STATES PATENT OFFICE.

PHILIP FREDERIC HAMBSCH, OF BURLINGTON, IOWA.

RANGE-FINDER.

1,001,845.  Specification of Letters Patent.  Patented Aug. 29, 1911.

Application filed December 16, 1910. Serial No. 597,661.

*To all whom it may concern:*

Be it known that I, PHILIP FREDERIC HAMBSCH, a citizen of the United States, and a resident of Burlington, in the State of Iowa, have invented certain new and useful Improvements in Range-Finders, of which the following is a specification.

This invention relates to range finders which depend upon the relatively large known dimensions of a distant object in order to determine the distance of said object from the range finder and the invention particularly relates to such a range finder which is provided with means whereby the distance may be read directly off the instrument.

This invention furthermore improves the construction which is disclosed in my application Serial No. 539,102 entitled range finders, filed January 10, 1910. As was set forth in said application, range finders in use at the present time on naval vessels employ, as a rule, a relatively small base near the hand, and the calculations or readings adduced under such circumstances are not as accurate as could be wished particularly when measuring distances of considerable length.

In the range finder disclosed in said application and also the one disclosed in the present application instead of employing a relatively small base near the hand, from which to make the measurements, the ship or other object, the distance of which is to be measured is itself employed as a base, and high power telescopes (say those which magnify from 14 to 20 times) with vertical and horizontal cross-wires are used in order that the instrument may be accurately fixed or set upon the distant object.

In the present invention there is provided a pointer which is connected to a pivot member carried by the frame which supports the telescopes and one end of the pointer has a movable connection with a telescope which is movably mounted on the frame while the other end of the pointer travels over a scale which is carried by the frame. The second telescope, in the structure as shown, is directly secured to the frame. The pivot member is mounted upon the frame so that it can be placed in different positions thereupon and it is so constructed that it can be secured thereto in the different positions. It is also so constructed and so connected to the pointer that it can be secured thereto in different positions. This member serves not only as a pivotal connection between the frame and the pointer in all the different positions which it may occupy when secured to both the said members, but also as a means for setting the instruments. The parts above referred to are all so constructed and arranged that by having the movable pivot member positioned at any particular point (corresponding to the known length or other known dimension of an object, which may be the ship of the distant enemy) on the pointer when the end of the latter is at initial position on the scale and the telescopes are sighted on the same point, the distance which an object is from the range finder can be read directly from the scale when the telescopes are sighted upon the extremities of a portion of said object having a known length.

As showing a specific embodiment of my invention, reference will be made to the drawings forming a part of the specification, and in which—

Figure 1 is a plan view of a range finder according to my invention, the telescopes being superposed over each other and in what may be termed the initial position. Fig. 2 is a side elevation of the instrument as it appears when mounted upon a tripod. Fig. 3 is an end elevation of the finder when mounted upon a tripod. Fig. 3ª is a view showing partly in section a ball bearing between the frame and the tripod. Fig. 4 is an end elevation of the instrument when mounted upon a member having a horizontal pivot instead of a member having a vertical pivot as shown in Figs. 2 and 3. Figs. 5 and 6 respectively show plan and section views of the pivot connecting or setting member between the frame and pointer. Fig. 7 represents a sectional view of anti-friction bearings between the movable arm carrying the upper telescope E and the sliding block J to which the pointer is connected. Fig. 8 is a plan view showing the position which the parts occupy when in a range reading position. In this figure the parts are shown as if the telescopes had been removed but the positions of the telescopes are indicated by broken lines.

The same reference character refers to the same part wherever it appears in the drawing or in the body of the specification.

In Figs. 2 and 3, A represents a tripod upon which is pivotally mounted so as to swing in a horizontal direction the frame B. The frame B comprises a sleeve C which encircles a vertically extending pivot member carried on the tripod and secured to the encircling member are the lower braces or rods $b'$ and $b^2$ which support the bar $b^3$ to which the lower telescope D is attached and these form the lower portion of the frame. The bar $b^3$ also carries a vertically extending member $b^4$ upon which there is pivotally mounted one end of a supporting rod or arm $b^5$ to which the upper telescope E is attached. The upper portion of the frame comprises rods or braces $c'$ and $c^2$ which carry an arc-shaped supporting member F upon which the free end of the movable arm $b^5$ may slide and by which said end of the arm may be supported. The upper portion of the frame also comprises other arms or braces $e'$ and $e^2$ which carry a curved range scale G and coöperatively related to the latter is a pointer L which is connected to the movable end of arm $b^5$ and also to the frame in a manner to permit of movement of the pointer over the scale when the arm $b^5$ is moved relative to the frame.

The outer end of the movable arm upon which the upper telescope E is attached, is provided with a slotted portion in which is mounted a sliding block J to which one end of the pointer L is pivotally connected. There is also carried by the arms $c'$ and $c^2$ of the frame by means of the posts $r'$ and $r^2$ a slotted member H in which is mounted the pivotal or setting member K which serves as a connection between the pointer L and the frame. The pointer L is provided with a slotted portion in which the sliding pivot member K can be positioned and secured and this slotted portion has a scale $h'$ marked thereupon whereby the pivotal member K can be positioned at any predetermined point in the slot. It will be observed that the member K comprises a pivot connecting pin $k'$ and clamps $k^2$ and $k^3$ for securing the member in place upon the pointer and also upon the slotted member H which is part of the frame. The upper clamp $k^3$ is cut out at $k^4$ and has an index mark $k^5$ to coöperate with the scale and to aid in the setting operation. The scale $h'$ on the pointer is preferably marked so that the pivotal member K can be positioned, when the pointer is at initial position and when the telescopes are sighted on the same point, at the proper place for an object having certain known dimensions, say the point marked 450 which is the proper point when it is desired to measure the distance of a vessel from the range finder, which vessel is known to be 450 feet long, so that the distance can be read directly from the range scale when the telescopes are sighted upon the extremities of the part which is of known length.

It will be observed that when the pivotal member K is near the range scale end of the pointer that the curve or arc through which said end of the pointer will travel will be of a much smaller radius than that which the same end of the pointer will travel when the pivotal end of the member K is near the end of the pointer which is attached to the telescope carrying arm $b^5$, and therefore the range scale end of the pointer will travel over different curves or arcs on the range scale when the pivotal or setting member K is in different positions, the different curves referred to being designated by the reference characters $O'$, $O^2$, $O^3$. It will also be observed from an inspection of the range scale shown that the curves above referred to are crossed by other lines or curves $p'$, $p^2$, $p^x$, etc. at one extremity of each of which a number for giving the direct reading appears.

It will be observed in Fig. 6 that there is a collar on the pivot pin $k'$ which separates the pointer L and the slotted member H. At opposite ends of the pin are nuts to maintain the parts in proper position relative to each other and these nuts can be tightened to hold the pin, the pointer and the clamping member engaging the same, or the pin, slotted member and the clamping member engaging the same, to clamp either of these together so as to minimize lost motion, but it should be noted that, when the member K is set in a position dependent upon a certain length of base and held in such position so that it cannot move longitudinally relative to the pointer and the slotted member, the connection is and must be such that the pointer can swing relative to the slotted member with the pin as a pivotal member.

The slotted portion of the pointer is so located that the pivotal or setting member K will always be located nearer to that end of the pointer which is connected to the movable arm $b^5$ to which the upper telescope is attached than it is to the range scale end thereof and therefore the latter end of the pointer moves a greater length than does that portion of the arm $b^5$ at the place where the pointer is movably connected thereto and this construction serves as a means for multiplying or magnifying the length of movement of said portion of the arm and thereby enables a more accurate reading of the pointer on the scale than could be obtained if the movements were not magnified or multiplied.

In order to facilitate the moving of the frame upon the tripod or supporting means a roller bearing is utilized as shown in Fig. 3ª. Also in order to minimize the friction between the sliding block J and the slotted portion of arm $b^5$ a roller bearing has been utilized between said parts as is shown in Fig. 7.

In the form shown in Fig. 4, the essential characteristics of the device are substantially the same as those shown in Fig. 1, but in the device shown in Fig. 4 the frame is mounted upon a horizontally extending pivot member instead of a vertically extending pivot member as is the device shown in Figs. 1 and 3, and this renders the device illustrated in Fig. 4 particularly adaptable for use where the object has a dimension which is of known height. The mode of operating the device shown in Fig. 4 is substantially the same as the mode of operating the device shown in Figs. 1 and 3 which will be clearly set out below.

If it is desired to ascertain the distance between the finder and a vessel of overall length of say 450 feet by the device shown in plan in Fig. 1, it may be accomplished as follows. First loosen the screws in the clamps in the setting member and move it to the position where index mark $k^5$ will be in alinement with the 450 mark on the pointer and clamp the setting member to the pointer. Then bring the pointer to initial position while the telescopes are sighted on the same point and clamp the setting member to part H of the frame. Now when one operator sights the vertical cross wire of one telescope on one extremity of the vessel and another operator sights the vertical cross wire of the other telescope on the other extremity of the vessel its distance from the range finder can be read directly from the range scale by following down the lines $p'$, $p^2$ or $p^x$ over which the pointer stops. The various curves upon the range scale which have been previously referred to may be worked out mathematically or may be plotted by carrying out a series of actual tests.

It is obvious from the above that the distance between the finder and object having a dimension of known length or height or breadth or the like may be readily ascertained by operating the range finder in the manner above described. It is also obvious that the device described in this application is adaptable for other uses than those above referred to and it is also obvious that many and various other forms and modifications may be made without departing from the spirit and scope of my invention.

I claim as my invention:

1. The combination of telescopes movable relative to each other and means between the telescopes to give a direct reading, said means comprising a movable setting member whereby in one position one set of readings may be made from a certain series of movements of the telescopes relative to each other and whereby in another position of the member another set of readings may be made for the same series of movements of the telescopes relative to each other.

2. The combination of telescopes movable relative to each other and means for giving a direct reading therefrom, said means in coöperative relationship with the telescopes and operable by a relative movement therebetween to give the direct reading, said means comprising a member capable of being positioned in one portion of said means to give one reading when the telescopes are in one position and said member also capable of occupying another position in said means whereby a different reading will be made when the telescopes occupy the same position as above referred to.

3. The combination of a plurality of telescopes carried by a frame and movable relative to each other and means comprising a member which is coöperatively related to the frame and which may be set at a desired position dependent upon the length of a certain part of a geometrical figure, said means also comprising members coöperating together so that another dimension of the geometrical figure may be read directly therefrom, one of which last mentioned members is operatively connected to at least one of the telescopes and the other of which members is operatively connected to at least one of the telescopes and the member which is coöperatively related to the frame.

4. The combination of two telescopes mounted on a frame and movable angularly relative to each other and means comprising a range scale member and a pointer member coöperatively related therewith, one of said members operatively connected to one of the telescopes the other of said members operatively connected to the other telescope, said means also comprising a setting member capable of being placed in a position dependent upon the known length of a portion of a distant object and operatively connected to one of said members whereby when the telescopes are sighted upon the extreme portions of that portion which is of known length the distance of the object from the finder can be read from the range scale.

5. The combination of two telescopes mounted on a frame and angularly movable relative to each other, one of said telescopes having securely fixed thereto a scale member and a movable member capable of being positioned at different points on the scale, the movable member operatively connected to the other telescope, the movable member also operatively connected to the frame in such manner by means of a movable setting member that when set in a determined position a direct reading can be taken from the first mentioned scale.

6. The combination of a frame, a telescope fixed thereupon, a second telescope movably mounted thereupon, a scale member carried by the frame, a member carried by the frame in which a movable setting member is mounted, an indicating member or pointer connected to the movable setting member and operatively connected with the movable telescope said indicating member or pointer being operatively connected to the movable setting member and to the second telescope in such manner that when the movable setting member is positioned at a determined point a direct reading can be taken from the scale.

7. The combination of telescopes movable relative to each other and adjustable setting means therebetween for giving a direct reading of a mathematical function for one position of the telescopes relative to each other and for giving another reading of the mathematical function for the same position of the telescopes relative to each other.

8. The combination of telescopes movable relative to each other and mounted on a frame, a range scale carried by the frame and a pointer coöperatively related to the scale, said pointer operatively connected to the telescope which is movable relative to the frame and also operatively connected to the frame at a point between the point of connection to the telescope and the range scale, one of the connections to the pointer comprising an adjustable member whose position can be varied dependent upon a mathematical function involving the points upon which the telescopes are sighted.

9. The combination of telescopes movable relative to each other and mounted on a frame, a range scale carried by the frame and a pointer coöperatively related to the scale, said pointer operatively connected to the telescope which is movable relative to the frame, and also operatively connected to the frame by means of a pivotal connection, said pivotal connection being nearer the telescope end of the pointer than it is to the range scale end of the same.

10. The combination of telescopes movable relative to each other and mounted on a frame, a range scale and a pointer coöperatively related thereto, said pointer movably connected to the telescope which is movable relative to the frame, and also operatively connected to the frame by means of a pivotal connection which can be secured to both the frame and the pointer.

This specification signed and witnessed this 13th day of December, A. D., 1910.

PHILIP FREDERIC HAMBSCH.

Signed in the presence of—
JOHN McKEE,
C. J. FIELDING.

---

Copies of this patent may be obtained for five cents each, by addressing the "Commissioner of Patents, Washington, D. C."